INVENTOR.
JOSEF HUBER

INVENTOR.
JOSEF HUBER

United States Patent Office 3,505,212
Patented Apr. 7, 1970

3,505,212
METHOD AND EQUIPMENT FOR ACTIVATED SLUDGE PROCESSING OF SEWAGE
Josef Huber, Kilchberg, Switzerland, assignor to Passavant-Werke, Michelbacher Hutte, near Michelbach, Nassau, Germany, a corporation of Germany
Filed Aug. 6, 1968, Ser. No. 750,607
Claims priority, application Germany, Aug. 11, 1967, 1,658,112
Int. Cl. C02c 1/06
U.S. Cl. 210—5
15 Claims

ABSTRACT OF THE DISCLOSURE

A sewage treatment process of the activated sludge type embodies two successive phases of aeration and circulation of the liquid sewage being treated. Sludge derived from the second phase is reintroduced in predetermined quantities into the sewage undergoing both phases of treatment to provide a heavily loaded but lightly concentrated first phase mixture and a lightly loaded but heavily concentrated second phase mixture Continuous circulation is maintained in both treatment phases but at different velocities and flow patterns, thereby providing high biological efficiency while at the same time reducing the amount of power required for aeration and circulation purposes.

BACKGROUND OF THE INVENTION

Field of the invention

The present invention concerns methods and equipment for treating sewage by an activated sludge process, and more particularly to such methods and equipment employing two stages of activated sludge treatment.

Description of the prior art

In a conventional activated sludge sewage treatment process, raw sewage is settled in a primary clarifier tank to remove most of the heavy suspended solids and is then introduced into an aerator tank in which the aeration of the "liquor" causes the organic pollutants therein to be reduced biologically into sludge which precipitates out of solution. As the liquor is aerated in the activator tank, activator sludge derived from the same installation is thoroughly mixed therewith to provide micro-organisms which greatly accelerate the biological reduction process taking place in the resulting so called "mixed liquor." Following such aeration and activation, the mixed liquor is transferred to a final clarifier tank in which both the activated sludge and the additional sludge resulting from the reduced pollutants are settled out and removed, with a portion of the latter then being reintroduced into the aerator tank. as previously related.

The capacity and efficiency of the biological reduction process employed in activated sewage processing installations is related directly to two factors; namely, (1) the concentration of the liquor, expressed in terms of kilograms of dry substance per cubic meter of solution and (2) the load of the liquor, expressed in terms of kilograms of biological oxygen demand (BOD) per kilogram of dry substance. It has been observed previously that the length of time required to process the mixed liquor can be reduced considerably if that liquor is heavily "loaded" and is subjected to increased aeration, preferably combined with strong circulation and with means for dispersing the sludge into small particles. However, these advantages to the employment of a heavily loaded mixed liquor are accompanied by a decrease in the purification achieved as compared to that produced in a weekly loaded mixed liquor, to the extent that no more than 90% of the organic pollutants can be effectively reduced. Additionally, since providing a weakly loaded condition in the activator tank requires the introduction of the corresponding greater amount of return sludge to increase the concentration of suspended solids, a corresponding increase is dictated in the power required to provide the desired aeration, mixing and circulation. Furthermore, the relatively fine dispersion of the sludge particles is detrimental to achieving effective flocculation and settling out of the sludge in the final clarifier tank.

In view of the foregoing, it has been proposed to subdivide the activation and aeration process in such a system into two phases comprising a first phase in which the liquor is heavily loaded but of relatively weak concentration and a subsequent second phase carried out in another tank under conditions in which the liquor is lightly loaded but of relatively strong concentration; thus reducing the power requirements and providing more effective settling and purification.

SUMMARY OF THE INVENTION

The present invention involves the treatment of sewage by an activated sludge process involving the above described two phase concept, but embodies a number of improvements both in the equipment and methods by which such processing is effected. Briefly, in accordance with the present invention, the effluent from the primary settling tank is introduced into a first phase tank in which it is mixed with return sludge to provide a heavily loaded but lightly concentrated mixed liquor which is thoroughly aerated, mixed and concentrated. The effluent from the first phase tank is mixed with the return sludge from the second phase tank; with part of the resulting mixture being returned to the first phase tank and the remainder passing into the lightly loaded heavily concentrated second phase tank, where further aeration mixing and circulation are carried out. Consequently by varying the proportions of the mixture passing into the two respective tanks, the sludge load in both tanks can be independently controlled by simple and reliable means throughout a continuous sewage treatment process.

Due to the fine particle dispersion and high circulation rate within the first phase tank, very little precipitation takes place in that tank. However, in the second phase tank, conditions should be favorable to precipitation in order that the effluent from that tank be relatively free of suspended solids. To achieve this result without sacrificing the effectiveness of the second treatment phase, the present invention contemplates circulating the mixed liquor in the second phase tank in a flow pattern different from that in the first phase tank and more conducive to effecting the desired flocculation and precipitation.

In addition to the aforementioned improvements relating basically to methods for practicing the subject two phase activated sewage treatment process, the present invention also relates to the physical structure of sewage treatment installations whereby those methods can be carried out in a continuous operation by means of a relatively inexpensive and uncomplicated installation. In accordance with a preferred embodiment of the present invention, the sewage treatment installation comprises an inner tank of rectangular annular form partially divided by a central wall member, and an outer tank arranged in annular fashion about the inner tank and separated therefrom by a double wall structure. The outer tank is considerably deeper than the inner tank and is provided with a downwardly tapered floor which provides a sludge collector sump. A divider wall divides the outer tank into two annular chambers both of which communicate with the sludge collector sump. This arrangement thus provides three annular tanks, the innermost of which serves as the first phase tank, the intermediate one as the second phase tank and the outermost one as the final clarifier tank.

The double wall structure between the first phase tank and the second phase tank defines a vertical central channel communicating by means of lateral openings with the first phase tank and extending downwardly to the sludge collector sump below the second phase tank and the clarifier tank. An upward flow of sludge laden liquor from the sump is produced in the vertical channel by the gases generated in the second phase tank, which reduce the specific gravity of the corresponding liquor, and by compressed air introduced into the channel. Consequently, sludge is withdrawn from the collector sump and rises through the channel, within which it is mixed with effluent from the first phase tank. The vertical channel is open along the top of the double wall structure separating the two tanks, whereby predetermined proportions of the sludge mixture emerging upwardly through the channel can be directed into both tanks by means of adjustable weir baffles along opposite sides of the channel opening. Between such weir baffles at the side of the channel adjacent the first phase tank, the double wall structure is provided with another series of openings communicating with a discharge manifold provided with an adjustable outlet valve. By this means, any desired proportion of the sludge laden liquor flowing from the vertical channel toward the first phase tank can be drained through the openings and discharged from the installation to thereby remove the entrained sludge for final processing.

Each of the first and second phase tanks is provided with its own aeration and circulation system whereby the corresponding liquor is aerated and is caused to circulate in a continuous annular flow pattern. Preferably, the aerating and circulating means employed in the two tanks comprise aerator rotors which are adapted to maintain continuous annular circulation. In the second phase tank, the horizontal flow velocity imparted to the mixed liquor decreases toward the bottom of the tank to promote biological reduction and sedimentation without disturbing the deposition of sludge in the collector sump. Below the surface of the liquid in the second phase tank and the adjacent final clarifier tank, those two tanks communicate with each other below the divider wall and through openings therein so that a substantially static condition prevails in the final clarifier tank. Accordingly, suspended solids passing into the final clarifier tank from the second phase tank precipitate out under substantially quiescent conditions as the resulting clarified liquid at the top of the clarifier tank is discharged through an appropriate spillway.

By means of such an installation, maximum efficiency and economy are achieved both from constructional and operational standpoints by means of a process which operates continuously and is readily adjustable to handle influent sewage of different characteristics.

Various other advantages and features of the invention will be apparent from the following detailed description of the illustrative embodiment thereof depicted in the accompanying drawings in which like reference numerals refer to like elements.

DESCRIPTION OF THE ILLUSTRATIVE PREFERRED EMBODIMENT

Figure 1:
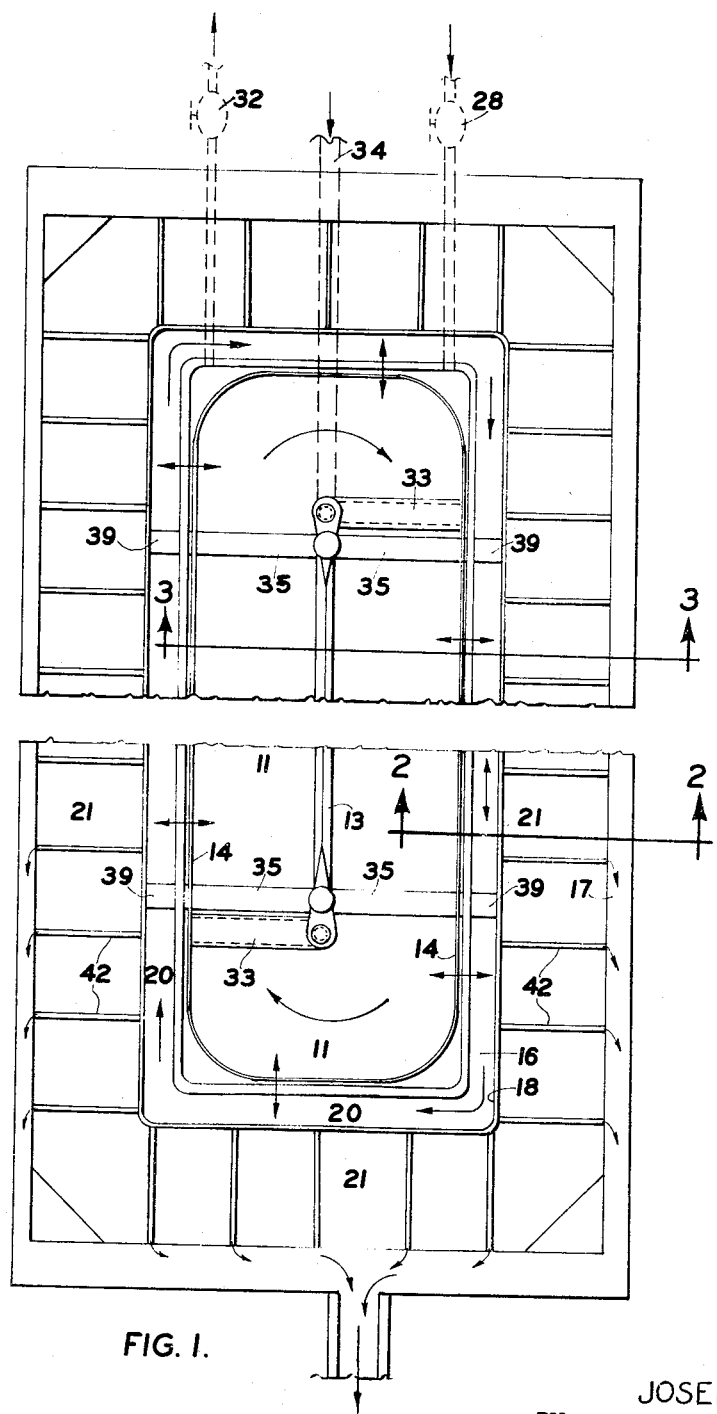
FIG. 1 is a somewhat schematic plan view of an activated sludge sewage processing installation according to a preferred embodiment of the invention.

By reference to the above-described drawings, it will be seen that the illustrated sewage treatment installation comprises a generally rectangular first phase tank 11 defined by the flat portion 12 of a floor member 13 surrounded by a generally rectangular inner wall member 14. Along the center of the first phase tank, central wall member 15 extends upwardly from floor member 13 to provide that tank with a rectangular annular configuration. Beyond wall member 14, the tank floor is sloped in V-shaped fashion to define a sludge collector sump 16 approximately midway between wall member 14 and the sloped outer wall member 17 defined by the upward continuation of floor member 13. A continuous divider wall 18 is supported between wall members 14 and 17 by baffle segments 19 traversing the sludge collector sump. This divider wall separates the second phase tank 20 adjacent the first phase tank from the clarifier tank 21 adjacent outer wall member 17, such two tanks communicating with each other below the divider wall and through openings 22 therein.

About the outer periphery of inner wall member 14, a second wall member 23 is spaced therefrom and extends downwardly into the collector sump, thus providing a continuous upwardly directed channel 24 extending from the sump to its open upper end, which is level with the top of wall members 14 and 23. As shown at 25, openings in the latter wall member provide communication between the first phase tank and channel 24. By reference to FIG. 2, it will be seen that compressed air from a manifold pipe 26 can be introduced into channel 24 through vertical air pipes 27 embedded in wall member 14. A valve in manifold pipe 26, which is illustrated schematically at 28 in FIG. 1, allows selective regulation of the volume of air introduced into channel 24 through air pipes 27. The open lower ends of these air pipes are located below a comblike element 29 located along the upper edge of the adjacent downwardly sloped portion of the tank floor leading to the sump. Along its upper edge, wall member 14 also includes a series of openings 30 which communicate with a continuous sloped drainage channel 31 cast into the wall member. This drainage channel, in turn, is adapted to discharge beyond the tank structure through an adjustable outlet valve depicted schematically at 32 in FIG. 1.

After preliminary settling in a separate primary clarifier tank, not shown, the sewage liquid to be treated is introduced into the first phase tank through transverse flumes 33 connected to the primary clarifier tank by means of conduit 34. Immediately adjacent each of these flumes is an aerator rotor segment 35 which extends across the opposite side of the first phase tank. The portions of these aerator rotor segments at opposite sides of the central wall member 15 are rotated in opposite directions by means of motor drive units 36, thereby providing a unidirectional annular flow of the liquid in the first phase tank in the direction represented by the arrows 37. In addition to circulating the liquid in the first phase tank, these rotors also serve to aerate that liquid as a result of the violent splashing and agitation thereby produced. If desired, similar additional aerator rotors can also be provided along the tank too.

Figure 2:
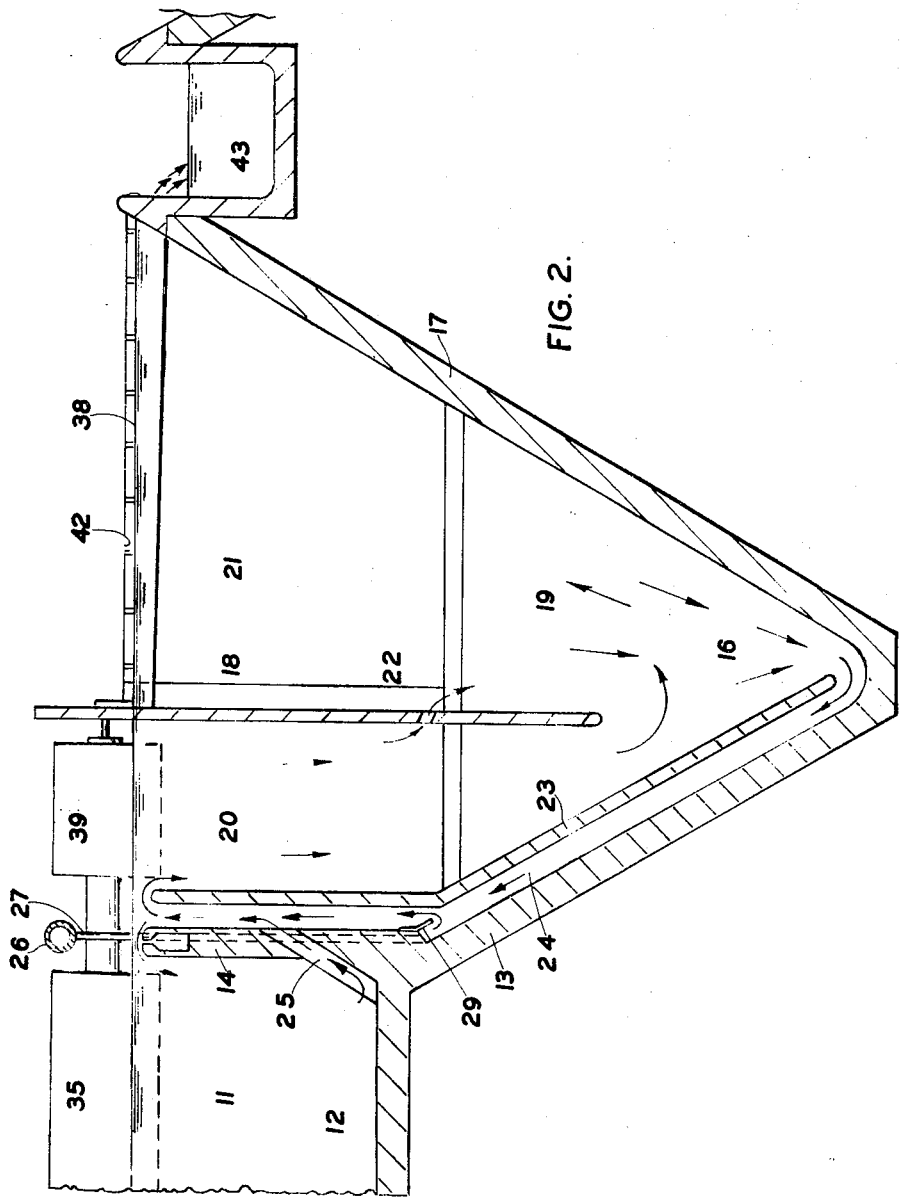
FIG. 2 is a partial cross-sectional end view of the installation depicted in FIG. 1, taken along line 2—2 of that figure.
Figure 3:
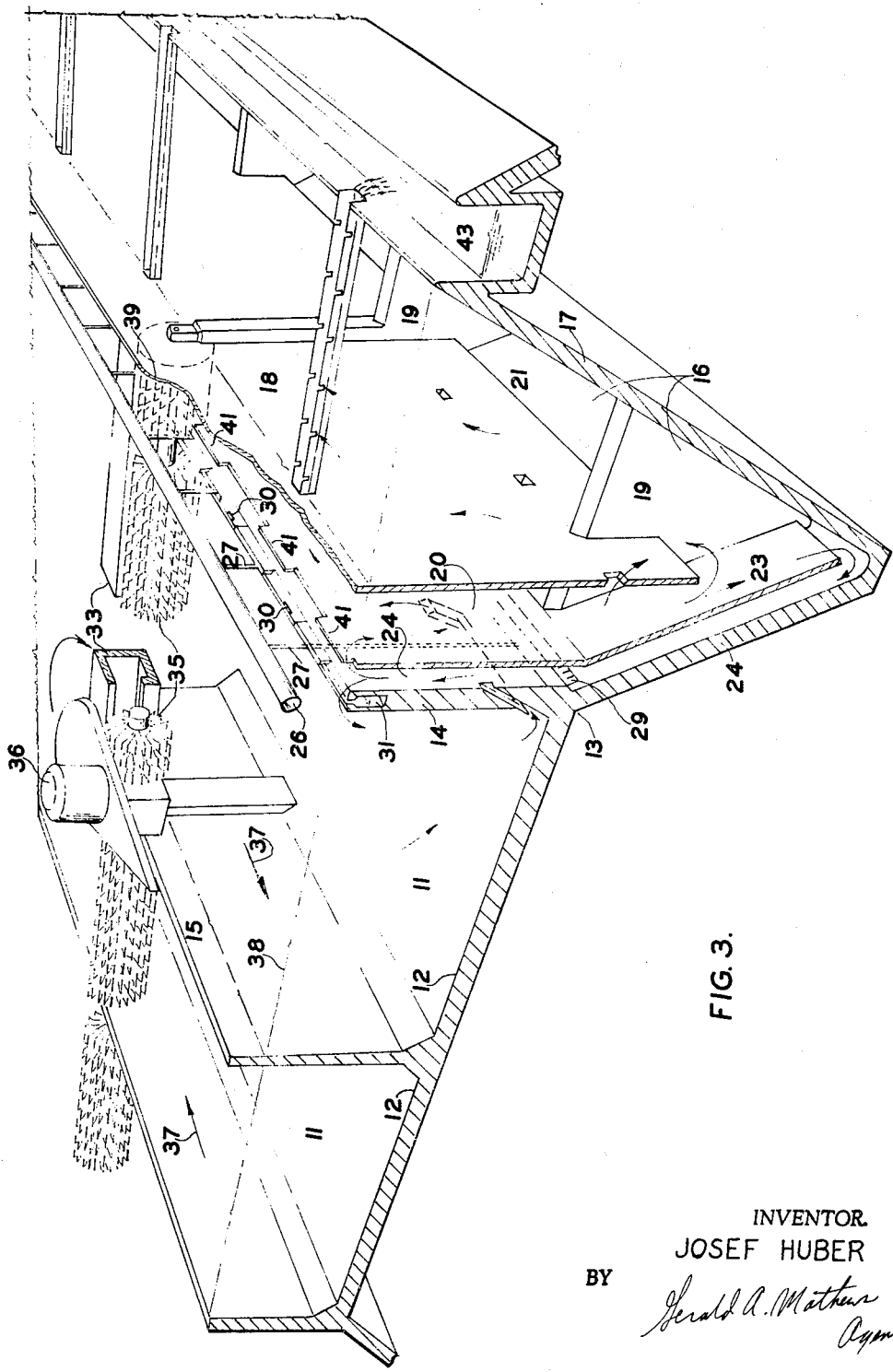
FIG. 3 is a partial perspective view of the installation shown in FIGS. 1 and 2 cross sectioned along the line 3—3 of FIG. 1.

Since all three of the processing tanks are in communication with one another, the liquid in all of those tanks assumes substantially the same level as shown at 38 in FIGS. 2 and 3. In the second phase tank the liquid is also circulated and aerated by means of rotor segments 39 attached to the corresponding ends of the corresponding rotor segments 35 in the first phase tank. Alternatively, the rotors in the second phase tank can be driven by separate drive means, not shown, thereby allowing the speed of those segments to be controlled independently. The reduced width of the second phase tank and its aerator rotor segments and the deep and baffled V-shaped configuration of the sludge sump tank, causes the liquid circulation in the second phase tank to be relatively rapid toward the top of the liquid but substantially quiescent in the lower sump region, thereby encouraging the precipitation of solid sludge materials into the collector sump. Since no circulation means are provided in the final clarifier tank, the liquid entering that tank from the relatively quiescent lower region of the second phase tank assumes an even more static state to promote further sedimentation of solid materials.

Due to the continuing biological action occurring in the second phase tank, considerable gas is generated in the sludge collector sump. This gas tends to decrease the specific gravity of the liquid in the second phase tank, thus establishing an upward flow of sludge laden liquid within channel 24. Additionally, the compressed air introduced into the channel further reduces the specific gravity of the sludge laden liquid therein to intensify its upward movement and to promote thorough mixing of the entire volume of that material with the effluent entering the channel from the first phase tank through openings 25. Therefore, the liquid and sludge mixture discharged upwardly through the open end of channel 24 is thoroughly mixed and heavily laden with sludge and is discharged out of the top of the channel at a rate determined by regulation of the amount of compressed air introduced into the channel. The comblike element 29 is adapted to disperse the compressed air uniformly along channel 24, while at the same time being substantially immune to becoming plugged by accumulations of precipitated sludge thereon.

As the sludge mixture issues upwardly out of channel 24, it is proportionately directed toward both the first and second phase tanks by means of simple adjustable spillway baffles 41 located along the top of wall members 14 and 23 at opposite sides of the channel opening. Additionally, the portion of the sludge laden effluent from the channel passing across the top of wall member 14 flows over the open ends of openings 30 communicating with drainage channel 31. Therefore, in accordance with the adjustment of valve 32, any desired portion of the sludge mixture discharged from channel 24 toward the first phase tank can be removed from the installation for further processing and disposal.

From the foregoing explanation, then, it will be seen that the present invention provides a simple and straightforward installation whereby a two phase activated sludge sewage processing treatment can be continuously carried out without interrupting the operation to effect adjustments in the aeration rate or in the percentage of activated sludge continuously introduced into the first and second phase tanks in any desired proportion.

As the effluent from the second phase tank enters the outermost clarifier tank, whatever solid sludge material still remains suspended therein gradually precipitates out into the sludge collector sump, thereby leaving the upper layer of liquid in that tank in a substantially clarified state. Due to the continuous inflow of sewage liquid into the first phase tank, the liquid level in the clarifier tank tends to rise so that the clarified uppermost strata of liquid in the latter tank continuously overflows into a plurality of spillway weirs 42 leading to a discharge trough 43 surrounding the entire installation. This discharge trough, in turn, is connected to appropriate effluent disposal conduits from which the clarified effluent liquid is removed from the installation.

Although the subject installation can be adapted easily to various processing conditions, a representative example of the process carried out thereby would involve maintaining a sludge concentration in the primary phase tank of from 1 to 1.5 kilograms of dry substance per cubic meter to provide a corresponding sludge load of 2 to 3 kilograms BOD (based on a 5 day retention scale) per kilogram of dry substance. By maintaining circulation in the first phase tank at a speed of 30 to 50 centimeters per second, a rapid reduction of up to 75% to 85% of the organic pollutants is realized with a relatively low expenditure of power during a retention period of about one hour, which provides in the neighborhood of 15 complete circulation cycles. In the second phase activation tank, the sludge concentration typically would be maintained at about 5 to 8 kilograms of dry substance per cubic meter with the horizontal flow rate decreasing from a maximum velocity of about 20 to 25 centimeters per second at the top of the tank to a substantially quiescent condition at the sludge collector sump. Consequently, even though the liquid in the second phase tank is of relatively heavy concentration, the power expended in performing the second phase aeration and circulation is not greater than that required in the first phase treatment in direct proportion to the increased concentration, because of the reduced average flow velocity maintained in the second phase tank.

Although the foregoing description relates to specific methods and equipment for practicing the invention, it will be apparent that variations and modifications of the illustrative preferred embodiment of the invention can be effected within the spirit and scope of the invention. Accordingly, the foregoing disclosure is to be considered only as illustrative and not as limiting the scope of the invention as defined by the appended claims.

I claim:

1. A method for removing organic pollutants from liquid sewage by an activated sludge process, said method comprising:
    (a) aerating said sewage in two successive treatment phases comprising a first treatment phase and a second treatment phase,
    (b) continuously circulating said sewage undergoing said first treatment phase at a relatively high flow velocity which discourages precipitation of sludge,
    (c) continuously circulating said sewage undergoing said second treatment phase at a relatively low flow velocity conducive to precipitation of sludge,
    (d) removing sludge laden liquid from the sewage undergoing said second treatment phase and mixing such sludge laden liquid with effluent from the sewage undergoing said first treatment phase, and
    (e) reintroducing the resulting mixture of said sludge laden liquid and said effluent into the sewage undergoing both said first and said second treatment phases in predetermined quantities such that the sewage undergoing said first treatment phase is heavily loaded but lightly concentrated and the sewage undergoing said second treatment phase is lightly loaded but heavily concentrated.

2. The method according to claim 1 in which all of the sludge laden liquid removed from the sewage undergoing said second treatment phase is mixed with said effluent.

3. The method according to claim 1 in which the flow of the sewage undergoing said second treatment phase is substantially horizontal at the upper levels thereof and diminishes in velocity to a substantially quiescent state at the lowermost levels thereof.

4. The method according to claim 3 in which the flow of said sewage undergoing said first treatment phase is substantially horizontal and of a velocity of more than 20 centimeters per second and in which the velocity of the uppermost level of the sewage undergoing said second treatment phase is less than 25 centimeters per second.

5. The method according to claim 1 in which the sewage undergoing said first treatment phase is loaded at least twice as heavily as the sewage undergoing said second treatment phase but has a concentration of no more than ⅓ that of the latter sewage.

6. A sewage treatment installation for removing organic pollutants from liquid sewage by means of a two phase activated slurge process, said installation comprising:
    (a) a first phase treatment tank adapted to contain said liquid sewage during a first phase in the treatment thereof,
(b) a second phase treatment tank adjacent said first phase treatment tank and adapted to contain said liquid sewage during a second phase in the treatment thereof,
(c) a wall structure separating said first and second phase treatment tanks,
(d) a clarifier tank adjacent said second phase treatment tank and adapted to contain said sewage liquid during a final clarifying phase in the treatment thereof,
(e) means defining a sludge collector sump below and in communication with both said second phase treatment tank and said clarifier tank,
(f) channel means defining a channel extending upwardly through said wall structure, said channel having an upper opening along the top of said wall structure and a lower opening in communication with said sludge collector sump,
(g) pumping means for producing an upward flow of sludge laden liquid from said sludge collector sump through said channel,
(h) passageway means defining lateral openings through said wall structure between said first phase treatment tank and said channel whereby effluent from said first phase treatment tank enters said channel and mixes with said sludge laden liquid flowing upwardly therethrough.
(i) flow diverter means for directing into each of said first and second phase treatment tanks predetermined proportions of the mixture of sludge laden liquid and effluent flowing upwardly out of said upper opening of said channel,
(j) sludge removal means for removing from said installation a predetermined proportion of said mixture flowing upwardly out of said upper end of said channel,
(k) aerations means for continuously aerating the liquid contents of said first and second phase tanks, and
(l) circulation means for continuously circulating the liquid contents within said first and second phase treatment tanks.

7. The invention defined by claim 6 in which said pumping means comprises:
(a) a source of compressed gas,
(b) conduit means for conducting compressed gas from said source thereof into said channel below the level of said lateral openings, and
(c) flow control means for selectively regulating the volume of gas introduced into said channel from said source through said conduit means.

8. The invention defined by claim 6 including a comb-like element located along said channel above the level at which compressed gas is introduced thereinto from said conduit means.

9. The invention defined by claim 6 in which said flow diverter means comprises a plurality of weir baffles extending upwardly from said wall structure adjacent opposite sides of said upper opening of said channel.

10. The invention defined by claim 6 in which said sludge removal means comprises means defining a conduit extending along said wall structure and communicating with a top surface thereof through at least one upwardly open aperture laterally adjacent said upper opening of said channel.

11. The invention defined by claim 10 including adjustable valve means for regulating the liquid carrying capacity of said conduit.

12. The invention defined by claim 6 in which said aeration means and said circulation means both are provided by:
(a) a generally horizontal and cylindrical first rotor adapted to be partially submerged in the liquid contents of said first phase treatment tank,
(b) a generally horizontal and cylindrical second rotor adapted to be partially submerged in the contents of said second phase treatment tank, and
(c) drive means for rotating said first and second rotors about their respective generally horizontal axes.

13. The invention defined by claim 12 in which said first and second rotors are of different axial lengths and are located in coaxial relation to one another, said rotors being positively connected for unitary rotation by said drive means.

14. The inention defined by claim 6 including:
(a) a V-shaped floor member located beneath both said second phase treatment tank and said clarifier tank to define said sludge collector sump along the lower internal apex of said floor member below and between said second phase treatment tank and said clarifier tank,
(b) a plurality of baffle members traversing said sludge collector sump, and
(c) a generally vertical divider wall supported above said sludge collector sump, said divider wall serving to define the division between said second phase treatment tank and said clarifier tank.

15. The invention defined by claim 6 in which said second phase treatment tank surrounds said first phase treatment tank in generally annular relation thereto and in which said clarifier tank surrounds said second phase treatment tank in generally annular relation thereto.

References Cited

UNITED STATES PATENTS

| 2,684,941 | 7/1954 | Pasveer | 210—209 |
| 3,355,023 | 11/1967 | Foster | 210—195 |
| 3,385,444 | 5/1968 | Dufournet | 210—195 |

MICHAEL E. ROGERS, Primary Examiner

U.S. Cl. X.R.

210—7, 14, 197, 256